United States Patent [19]

Girault et al.

[11] Patent Number: 5,768,379
[45] Date of Patent: Jun. 16, 1998

[54] SYSTEM FOR THE CHECKING OF LIMITED ACCESS TO AUTHORIZED TIME SLOTS RENEWABLE BY MEANS OF A PORTABLE STORAGE DEVICE

[75] Inventors: Marc Girault; Renaud Reitter, both of Caen; Marie-Josèphe Revillet, Verson, all of France

[73] Assignee: La Poste, France

[21] Appl. No.: 619,771

[22] PCT Filed: Jul. 11, 1995

[86] PCT No.: PCT/FR95/00935

§ 371 Date: Mar. 7, 1996

§ 102(e) Date: Mar. 7, 1996

[87] PCT Pub. No.: WO96/02899

PCT Pub. Date: Feb. 1, 1996

[30] Foreign Application Priority Data

Jul. 13, 1994 [FR] France .................. 94 08770

[51] Int. Cl.$^6$ ............................................. H04L 9/16
[52] U.S. Cl. ................................... 380/21; 380/30
[58] Field of Search ................... 380/21, 23–25, 380/30

[56] References Cited

U.S. PATENT DOCUMENTS

| | | | |
|---|---|---|---|
| 4,453,074 | 6/1984 | Weinstein | 380/30 |
| 4,720,860 | 1/1988 | Weiss | 380/23 |
| 4,837,822 | 6/1989 | Croskey et al. | 380/30 |

FOREIGN PATENT DOCUMENTS

| | | |
|---|---|---|
| A-30381 | 6/1981 | European Pat. Off. . |
| A-122244 | 10/1984 | European Pat. Off. . |
| A-253722 | 1/1988 | European Pat. Off. . |
| A-299826 | 1/1989 | European Pat. Off. . |
| A-422757 | 4/1991 | European Pat. Off. . |
| WO-A-9118169 | 11/1991 | WIPO . |

Primary Examiner—Salvatore Cangianlosi
Attorney, Agent, or Firm—Nilles & Nilles, S.C.

[57] ABSTRACT

The invention relates to systems for checking access limited to authorized time slots renewable by means of a portable storage device.

The system comprises, for this purpose, an element (LE) producing electronic keys formed by a data element pertaining to a time slot and by the signature of this data element. These keys are loaded into devices such as memory cards (C). Electronic locks (L) capable of verifying the signatures are implanted in the different (physical or logical) locations, the access to which has to be guarded.

Application to the checking of access to buildings or computer systems.

20 Claims, 1 Drawing Sheet

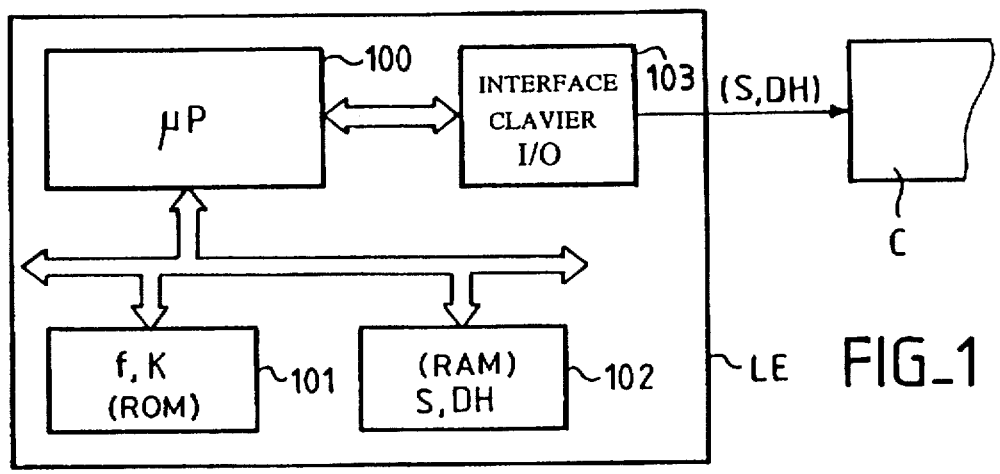
FIG_1
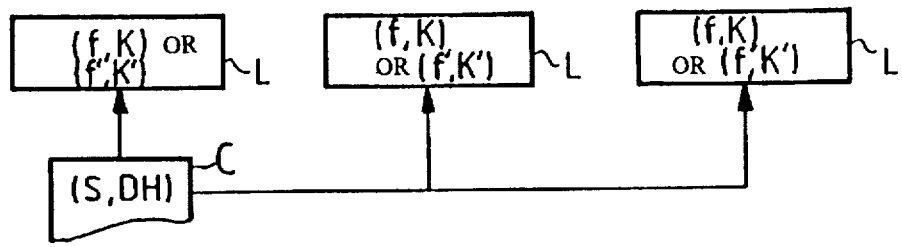
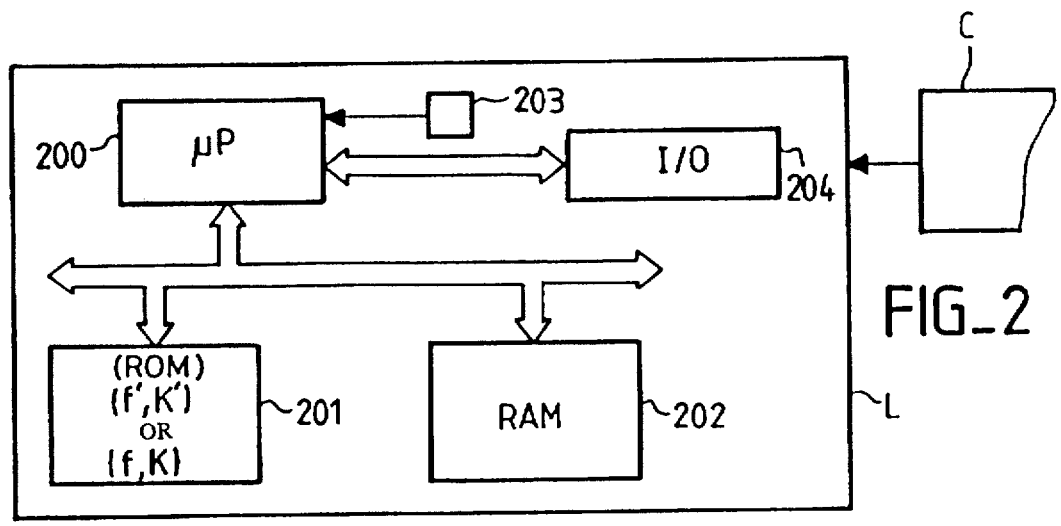
FIG_2
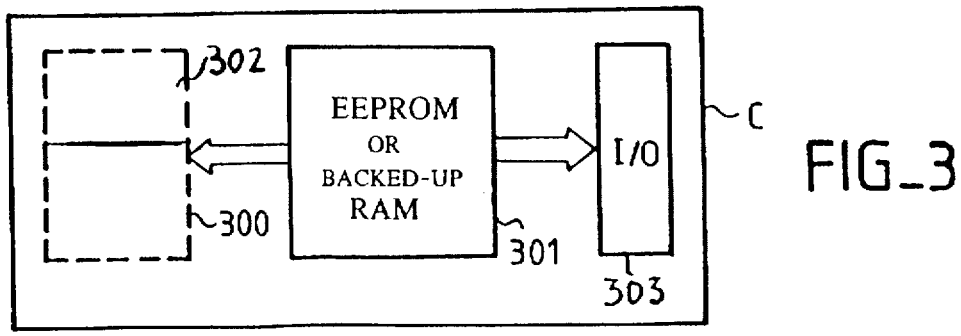
FIG_3

SYSTEM FOR THE CHECKING OF LIMITED ACCESS TO AUTHORIZED TIME SLOTS RENEWABLE BY MEANS OF A PORTABLE STORAGE DEVICE

FIELD OF THE INVENTION

The invention relates to a system for the checking of limited access to authorized time slots renewable by means of a storage device.

The invention can be applied especially to the checking of access to buildings, computer systems or objects of any kind whose opening and use has to be supervised.

DESCRIPTION OF RELATED ART

The best known way to lock access, whether to a building or to any other object, is to place a mechanical lock thereon and give a key to those persons who have authorized access. Naturally, the drawback of this method lies in the fact that it is perfectly possible to duplicate the mechanical keys. A key of this kind may also be stolen and used by a thief, the only possible solution then being to change the cylinder of the lock.

A second method which, however, is an electronic method consists in providing for a lock with a password. Only users who know the password are entitled to enter the building under protection.

Unfortunately, this approach is not infallible. For, when a user enters his password through a keyboard, it is quite possible to design an electronic system capable, at this point in time, of reading his password as he enters it, thus enabling an ill-intentioned person to re-use it.

There is besides a known way of guarding the access to computer programs by means of passwords. This method of protection has the above-mentioned drawback.

There is also a known procedure of authentication called the Kerberos system by which the access to an open computer network can be guarded. A description of this procedure will be found in the MIT publication, "An Authentification Service For Open Network Systems", dated 30 Mar. 1988.

This procedure is used to identify a "customer", namely a user, and to enable him to gain access to an information retrieval center (a service, an application or a program) by providing him, for this purpose, with an electronic ticket and more specifically with an information element encrypted by means of a key. This ticket is prepared by the information retrieval center for the customer. Furthermore, the ticket is not enough to obtain permission for access: a second encrypted information element is also used in the procedure in combination with the ticket.

A procedure of this kind is cumbersome and calls for relatively powerful computing means. This is not a constraint in the application given but may become so for any other application for which the memory space and the computing means are not as great as those of a information retrieval center.

Furthermore, the second encrypted information element is prepared for access between a customer and an information retrieval center and can be used only once for this link.

To date, there is no simple system that can be used to provide a system of secured access based on a data element corresponding to a limited and renewable period enabling the authentication of the user and at the same time providing him with right of access.

SUMMARY OF THE INVENTION

The present invention is aimed at overcoming these drawbacks.

Furthermore, according to the invention, it is no longer necessary to have to prepare a black list of lost or stolen or duplicated means of access and to have to manage such lists because, as shall be seen here below in the description, a lost or stolen device cannot provide right of access outside the authorized time slot if this slot is not renewed. The shorter the period of authorization of access, the less necessary will it be to enter this device in a black list.

According to the invention, the checking of access is done not by mechanical means but by logic means that make use of an electronic signature of data elements pertaining to a predetermined period of authorization of access limiting the validity of use of the device in which it is stored. Indeed, according to the invention, the signature is stored in the portable storage device along with, depending on the algorithm used, the data element in order to enable access to all the installations containing the protection system according to the invention.

An object of the present invention more particularly is a system for checking access by means of a portable storage device (C), chiefly characterized in that it comprises:

1) means (LE) capable of delivering at least one electronic key and of recording it in the storage device held by a user to give him a right of access to the units to be guarded, this key having at least one data element DH corresponding to a predetermined period of authorization of access and a signature S of the data element DH, these means being capable of preparing a new signature S at the request of the user for each new period of use and of loading it into his storage device in order to renew his right of access as many times as is necessary;

2) means (L) fulfilling an electronic lock function capable of delivering an authorization access signal (A) should the storage device (C) comprise, in the memory, the data element DH and the signature S required for the period of use considered, these means being capable of comparing the data element DH with the period considered and of ascertaining that the signature S is truly the signature of this data element DH.

The term "electronic signature" must be understood herein in the broad sense. It may be an electronic signature obtained by any known cryptographic mechanism, namely enciphering or authentication mechanisms.

Preferably, the data element DH pertaining to the predetermined period of validity has an information element on the date of use and a time slot of use.

According to one embodiment, several signatures $S_j$ are computed and recorded on the devices of the users by the key-preparing means (S), for one and the same data element DH, these signatures being obtained through one and the same secret key K and through a function of production f such that $S_j = f(K, DH, a_j)$, the parameters $a_j$ being predetermined and recorded in the electronic locks. Thus, according to this embodiment, the number of times that the user can obtain access in the period considered is limited. The user will have as many rights of access as he has signatures computed and recorded on his device for the period of authorization considered. A signature is necessary in each case of access.

According to one embodiment, the signature is obtained by means of a production algorithm with a secret key.

According to another embodiment, the signature may be obtained by means of a production algorithm with a public key.

According to the invention, the signature will be obtained preferably with an algorithm based on a public key for an application of a type intended for public use, i.e. when the verification of the signature is done through means placed in a public environment.

According to another embodiment, the key used to prepare the signatures is the same for all the signatures loaded into the devices and renewed.

According to another characteristic of the invention, with this key K there is associated a data element Z that is distinct depending on the geographical or logic zones of use so that these zones of use can be distinguished.

According to another embodiment, different keys are used to prepare the signatures loaded periodically, one key being chosen for each specific geographical or logic zone.

According to another characteristic of the invention, it is possible to use a diversified key Kc produced out of a known type of diversification function.

According to another characteristic of the invention, the time slot having a determined validity is divided into a given number of consecutive time slots and a signature Si is prepared for each of these slots.

BRIEF DESCRIPTION OF THE DRAWINGS

The invention will be understood more clearly from the following description, given by way of a non-restrictive indication and made with reference to the drawings, of which:

FIG. 1 shows a schematic view of the principle of a system that is the object of the invention.

FIG. 2 is a drawing of a practical embodiment of the means used to check electronic keys according to the invention.

FIG. 3 is a drawing of a practical embodiment of a storage device according to the invention.

DETAILED DESCRIPTION OF THE PREFERRED EMBODIMENTS

Hereinafter in the description, the terms "signatory entity" or "authorized entity" refer to the means used to prepare the electronic keys, namely the pairs S, DH (electronic signatures and data elements), these means furthermore enabling the loading of these signatures into the storage devices. The term "electronic lock" refers to the means used to check the data elements read in the storage devices.

The signatory entity is, according to the invention, capable of producing an electronic signature S from a production function f and a secret key K.

The electronic signature of a data element DH by the signatory entity may therefore be written as follows: S=f (K, DH).

In order that the signature of the signatory entity may be verified by each of the electronic locks capable of giving access, these locks have appropriate cryptographic means available to them. These means can be divided into a verification algorithm f' and a verification key K' which, depending on whether the signature algorithm is a secret key or a public key, is equal to the secret or public key of the signatory entity. In the former case, we therefore have K=K'.

In the latter case it will be impossible, with K' being known, to deduce K therefrom.

Depending on the applications planned, the electronic locks may be placed either in a public environment or in a private environment. Should the electronic lock be placed in a public environment, preferably an algorithm with a public key will be used so that these electronic locks contain no secret information and so that it is not worthwhile to read their contents fraudulently. Thus, the security of the system will be increased and vandalism will therefore be discouraged by making it unnecessary.

Thus, according to the invention, the storage device then has the function of an electronic key capable of opening all the electronic locks laid out throughout a territory or a particular zone. According to the invention, the electronic key function is obtained by means of a data element pertaining to a pre-determined period of authorization of access limiting the validity of the device. This period is in the form, for example, of a date and time at the beginning of a time slot and a date and time at the end of the time slot hereinafter referenced DH. It may also be a date and time of an end of authorization.

During the checking of access, the electronic lock which is advantageously provided with an internal clock ascertains that the information on current date/time is truly within the time slot and then verifies the signature by means of the verification key (which is secret or public as the case may be) that it has at its disposal. If the two checks are satisfactory, the lock sends an access authorization signal A.

For example, should an algorithm with a secret key be used, the electronic lock reads the slot DH recorded in the storage device, reads the information on current date and time from its internal clock and ascertains that this information is within the slot read in the device, then computes a signature S'=f (K, DH). The lock will also read the signature that has been memorized in the device and ascertain that the S signature computed is equal or not equal to the signature read.

Should an algorithm with a public key be used, then the electronic lock reads the data element pertaining to the time slot DH, reads the date and time given by its internal clock and ascertains that this current date and time are truly within the slot read in the storage device. The electronic lock will also read the signature S that has been memorized in the device and, by means of the verification function f and the public key K' associated with K, ascertain that this signature S is truly the signature of the data element DH, which can be expressed in the form.

$$f(K', DH, S)="OK",$$

the information element "OK" will correspond in practice to one bit at 1 or at 0 according to the convention adopted.

The description that follows will now spell out details of practical embodiments. Reference could be made to FIGS. 1 to 3 for a clearer understanding.

As has been stated, the system according to the invention makes it possible to avoid having to keep black lists and having to manage these lists whenever there is a request for access to buildings or to computer systems or any other type of object, as needs to be done with the prior art techniques.

Thus, to achieve this goal, the invention replaces the conventional means of mechanical access associated with a mechanical key by logic means residing in an electronic signature computed by an authorized entity having received a secret key K for this purpose.

The invention therefore furthermore consists in loading an electronic signature into each device. The data element signed by this electronic signature comprises a data element pertaining to a predetermined period of validity of use. Thus, outside this period of validity of use, the signature is no longer recognized and the access is therefore not authorized. If the loading of a new signature has not taken place, the access will then no longer be authorized.

FIG. 1 shows a drawing of a system according to the invention. This system has means for the preparation of electronic signatures LE. In practice, these means could be formed by an encoding reader comprising a microprocessor or a microcontroller, programmed so as to implement a production algorithm f. It could, for example, be an algorithm with a secret key or an algorithm with a known public key.

We may cite, as an example of an algorithm with a secret key, the DES (Data Encryption Standard) algorithm and, as an example of an algorithm with a public key, the RSA (Rivest Shamir Adleman) algorithm.

Hereinafter in the description, these algorithms shall be represented by a function f.

The reader/encoder furthermore enables the loading of the signatures into the storage devices. For this purpose, there is chosen a known reader/encoder suited to the storage device chosen. It is possible for example to take commercially available readers/encoders that enable the reading and writing to be done in a magnetic card or in a memory card with flush contacts or a reader/encoder adapted to reading or to writing on an electronic key with flush contacts or a reader/encoder adapted to reading and writing on contact-free cards.

The example illustrated in FIG. 1 shows the electronic diagram of a reader/encoder adapted to reading and writing on a memory card type of storage device.

This reader/encoder is of a known type and has a microprocessor 100 (or microcontroller) with an associated program memory 101 of the ROM or EEPROM (electrically erasable) type and possibly a RAM type working memory 103.

This reader/encoder LE has an input/output interface 103 adapted to the storage device. It will have a transmission/reception antenna in the case of a contact-free reading/writing device. It will have contacts adapted to the flush contacts such as those of chip cards or of electronic keys. This reader furthermore has a keyboard that is not shown.

The non-volatile memory 101 of the reader/encoder LE contains the program for implementing the function f chosen and a conventional program for reading and writing on a storage device. The key K will also be recorded in this memory.

The signature computed may be the same for all the devices. If the signature S is the signature of a data element DH, then it will mean that this data element DH is the same for all the devices.

The signatures computed may be different for each device.

The signatures S designed for each device may then be computed in advance or one at a time. Should they be computed in advance, the data elements DH pertaining to each use should be recorded in a non-volatile memory of the reader/encoder. In this case, the storage will also be done in a table so as to obtain the correspondence, with each use, of the pair, namely the signature S and the data element DH, that is assigned to it.

In this case, when a storage device is introduced into the reader/encoder by a user, the user may enter his identification number on the keyboard of the reader/encoder and the reader/encoder will make a search, in the table, for the signature S and the data element DH that is assigned to this use and load them into the memory of the device.

Naturally, it is possible to proceed in a different manner without thereby changing the principle of the invention. Indeed, the signatures may be computed as and when they are necessary, i.e. at each request for a loading in the storage device made by a user. In this case, it is not necessary to store a table containing the different signatures and the different data elements pertaining to each of the users. The user himself enters the data element DH proper to him and the computation is done in real time by the reader/encoder LE.

The signatures produced may be different because the production keys chosen are different. This difference may be introduced by a predetermined data element Z enabling the zones of use, either geographical zones or logic zones, to be distinguished. They will be logic zones when the permission has to be given for access to certain programs and not other programs in a computer system.

According to the invention, the buildings or systems subjected to access control are furthermore equipped with electronic lock type verification means which, in the particular application described, will be formed by a reader of a type that reads either cards with flush contacts as shown in FIG. 2 or contact-free cards or magnetic tracks, depending on the device used.

S This reader L conventionally has a processing unit 200 formed by a microprocessor and memories associated with it, a non-volatile memory 201 and a working memory 202. The reader furthermore has an internal clock 203.

In the non-volatile memory (for example of the ROM type) there is the function f for the verifying of the signature used, as well as the key K used to verify the signatures.

The storage device for its part has a non-volatile memory 301 that will preferably be chosen to be electrically reprogrammable (saved RAM or EEPROM). According to certain applications, the storage device could furthermore comprise a microprocessor type of processing unit 300 with a ROM type associated memory 302 comprising one or more encryption functions. A storage device of this kind is shown schematically in FIG. 3.

The invention could advantageously be applied to access to buildings (and possibly to letter-boxes) by postmen.

Each postman will then be assigned an electronic key enabling him to enter all buildings (and possibly to gain access to letter-boxes in these buildings) in a given zone within a given time slot. For this purpose, a certain number of information elements characteristic of this zone and this time slot will be recorded daily in the key.

Of course, the invention can be used by any other organization that needs frequent access to buildings. In this application, all the data elements contained in the electronic locks affiliated to a given zone and pertaining to a given organization will be identical, and the electronic key held by a member of this organization will serve as an electronic pass key.

The postman will not have any reason to duplicate the electronic key since it will stop giving access as soon as its period of use is over.

Should the number of uses be limited within the period considered, each signature Sj loaded into his card will give him one entitlement of access and will not be capable to being re-used. For this purpose, the computation of the signature could bring into play predetermined parameters aj which could, for example, be common to all the cards. These parameters will be recorded in the locks.

We claim:

1. A system for checking a right of access to guarded units, the right of access being contained in by a portable storage device, the system comprising:

means for delivering an electronic key to the storage device, the storage device being held by a user, the electronic key giving the user the right of access to the guarded units, the electronic key having a data element DH corresponding to a predetermined period of authorization of access and a signature S of the data element DH, the delivering means preparing a new signature S at the request of the user for each new period of authorization access and delivering the new signature into the storage device in order to renew the right of access a plurality of times; and means for electronically locking the guarded units, the electronic locking means delivering an authorization access signal when the storage device contains the data element DH and the signature S required for the period of use considered, the electronic lock means comparing the data element DH with the period considered and ascertaining that the signature S is the signature of the data element DH.

2. A system for checking access according to claim 1, wherein the data element DH pertaining to the predetermined period of validity includes an information element which pertains to the date of use and a time slot of use.

3. A system for checking access according to claim 1, wherein the electronic locking means comprises an internal clock which provides a real-time temporal data element H, wherein the electronic locking means compares the data element DH with the real-time temporal data element H given by the internal clock, in order to deliver or not deliver the access authorization signal depending on the result of the comparison.

4. A system for checking access according to claim 1, wherein the delivering means comprises a processing unit connected to a non-volatile memory in which there is recorded the data element DH and a data signature algorithm f so that S=f (K, DH), K being a secret key, and the algorithm f is an algorithm with one of a secret key and a public key.

5. A system for checking access according to claim 1, wherein a plurality of rights of access to the guarded units are given by a plurality of portable storage devices held by a plurality of users, and wherein a key K used to prepare the signatures for the plurality of storage devices is the same for all the signatures loaded and renewed in the plurality of storage devices.

6. A system for checking access according to claim 1, wherein in order to distinguish different zones of use, there is associated, with a key K used to compute the signature S of the data element DH, a data element Z that is distinct for each zone.

7. A system for checking access according to claim 6, wherein different keys K are used to prepare the signatures, a different key being used for each zone.

8. A system for checking access according to claim 1, wherein a key used to prepare the signature is a diversified key $K_c$=Div (K, C), C being a predetermined data element and Div a diversification function.

9. A system for checking access according to claim 2, wherein the time slot having a determined validity based upon the data element DH is formed by several consecutive time slots DHi, and wherein the delivering means prepares a signature Si for each of the slots.

10. A system for checking access according to claim 1, wherein several signatures Sj are delivered to the storage device by the delivering means, for one and the same data element DH, these signatures being determined using a secret key K and a production function f such that Sj=f (K, DH, aj), aj being parameters predetermined and recorded in the electronic locking means.

11. A system for checking access according to claim 1, wherein the electronic locking means comprises a processing unit and a non-volatile memory in which is stored a signature verification algorithm and a signature verification key.

12. A system for checking access according to claim 11, wherein the electronic locking means reads the storage device.

13. A system for checking access according to claim 12, wherein electronic locking means comprises a reader, the reader being one of a memory card reader and an electronic key reader.

14. A system for checking access according to claim 13, wherein the reader reads one of magnetic cards, chip cards with flush contacts, and contact-free chip cards.

15. A system for checking access according to claim 1, wherein the storage device comprises a non-volatile electrically reprogrammable memory.

16. A system for checking access according to claim 15, wherein the storage device is one of a memory card with flush contacts, a contact-free memory cards, an electronic key and a magnetic card.

17. A system for checking access according to claim 1, wherein the guarded units are buildings.

18. A method of checking a right of access to guarded units, the method comprising the steps of:

(A) computing an electronic key at a signatory entity, the electronic key including a signed data element DH which represents a predetermined period of authorization of access, the data element being signed with a signature S, where S=f (K, DH) with K being a key and f being a signature production function;

(B) transferring the electronic key from the signatory entity to a portable storage device, the storage device being held by a user to give the user the right of access to the guarded units;

(C) permitting access to the guarded units only during the predetermined period of authorization access, the access being permitted on the basis of the electronic key, including the steps of
(1) verifying that access is being requested during the predetermined period of authorization access by comparing the data element DH with information obtained from a clock, and
(2) verifying that the signature S for the data element DH is valid using a signature verification function f'(K', DH, S), where K' is a public key; and (D) permitting access to the guarded units during additional predetermined periods of authorization access, including the steps of
(1) renewing the right of access, including the step of transferring a new signature from the signator entity to the portable storage device, the new signature corresponding to a new predetermined period of authorization of access,
(2) permitting access to the guarded units only during the new predetermined period of authorization access, including the step of verifying that the new signature is valid, and
(3) repeating steps (D)(1) and (D)(2) for each remaining additional predetermined period of authorization access.

19. A method according to claim 18, wherein the storage device is one of a memory card with flush contacts, a contact-free memory cards, an electronic key and a magnetic card.

20. A method according to claim 18, wherein the guarded units are buildings.

* * * * *